United States Patent [19]

Yokooku et al.

[11] Patent Number: 4,572,031

[45] Date of Patent: Feb. 25, 1986

[54] AUTOMOTIVE DRIVING CONTROL SYSTEM UTILIZING A STEPLESS TRANSMISSION

[75] Inventors: Katsuhiko Yokooku; Nobuhide Seo; Hiroyuki Oda; Satoshi Yatomi, all of Hiroshima, Japan

[73] Assignee: Mazda Motor Corporation, Hiroshima, Japan

[21] Appl. No.: 591,841

[22] Filed: Mar. 21, 1984

[30] Foreign Application Priority Data

Mar. 26, 1983 [JP] Japan .................................. 58-50988

[51] Int. Cl.[4] ....................... B60K 41/18; B60K 41/12
[52] U.S. Cl. .......................................... 74/866; 74/871
[58] Field of Search ........................ 74/866, 870, 871; 364/424.1; 123/559, 435

[56] References Cited

U.S. PATENT DOCUMENTS

| | | | |
|---|---|---|---|
| 4,107,776 | 8/1978 | Beale | 364/424.1 X |
| 4,291,594 | 9/1981 | Baudoin | 74/877 X |
| 4,321,902 | 3/1982 | Stoltman | 123/435 |
| 4,350,135 | 9/1982 | Casey et al. | 123/564 |
| 4,383,456 | 5/1983 | Ganoung | 74/877 X |
| 4,401,079 | 8/1983 | Aoki et al. | 123/435 |
| 4,438,664 | 3/1984 | Fiala | 74/877 X |
| 4,458,560 | 7/1984 | Frank et al. | 74/877 X |
| 4,458,561 | 7/1984 | Frank | 74/877 X |
| 4,459,878 | 7/1984 | Frank | 74/877 X |
| 4,485,793 | 12/1984 | Oguma | 123/559 |
| 4,505,169 | 3/1985 | Ganoung | 74/866 X |

FOREIGN PATENT DOCUMENTS

| | | | |
|---|---|---|---|
| 0073475 | 3/1983 | European Pat. Off. | 74/866 |
| 53-134162 | 11/1978 | Japan . | |
| 0124027 | 7/1983 | Japan | 123/435 |
| 1556888 | 11/1979 | United Kingdom | 74/866 |

OTHER PUBLICATIONS

"Continuously Variable Transmission Control", Ironside et al., Proceedings of the Technical Programme of Internepcon UK '80, 14-16, Oct. 1980, pp. 295-302.

*Primary Examiner*—George H. Krizmanich
*Assistant Examiner*—Dirk Wright
*Attorney, Agent, or Firm*—Murray, Whisenhunt and Ferguson

[57] ABSTRACT

An automotive driving control system comprises a stepless transmission provided between the engine and the driving wheels, a transmission controller for controlling the transmission ratio of the stepless transmission, a throttle valve driver for driving the throttle valve of the engine, an operating state detector for detecting a particular operating state of the engine such as "knock" or resonance with the vehicle body, and a controller for controlling the transmission controller and the throttle valve driver. The controller controls the transmission controller and the throttle valve driver to respectively control the transmission ratio of the stepless transmission and the opening degree of the throttle valve so as to obtain that engine output which corresponds to the amount of depression of the acceleration pedal. When the particular operating state of the engine occurs, the controller controls the transmission controller and the throttle valve driver to respectively control the transmission ratio and the opening degree of the throttle valve so that the engine speed is changed without changing the engine output corresponding to the amount of depression of the accelerator pedal.

10 Claims, 16 Drawing Figures

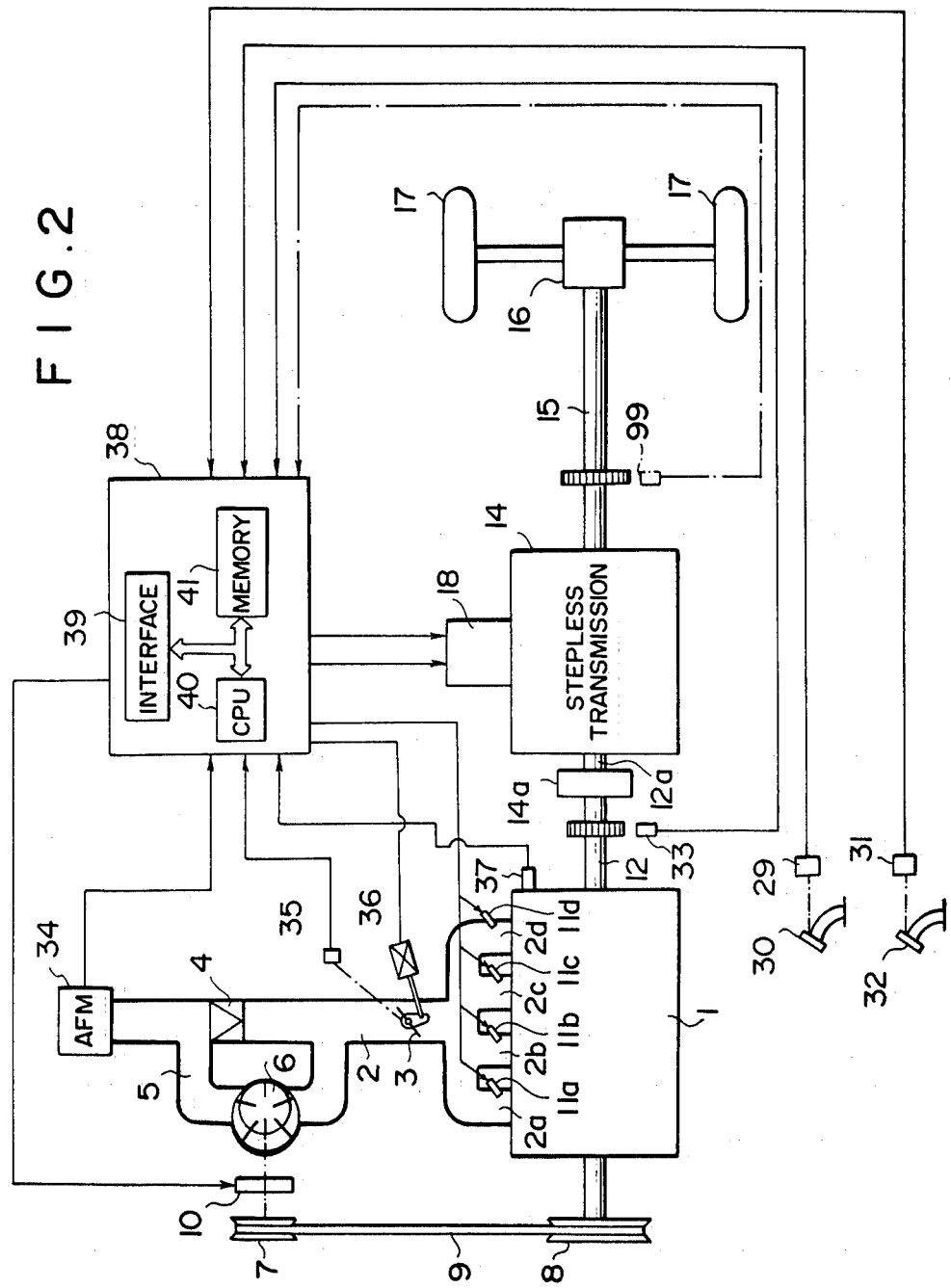

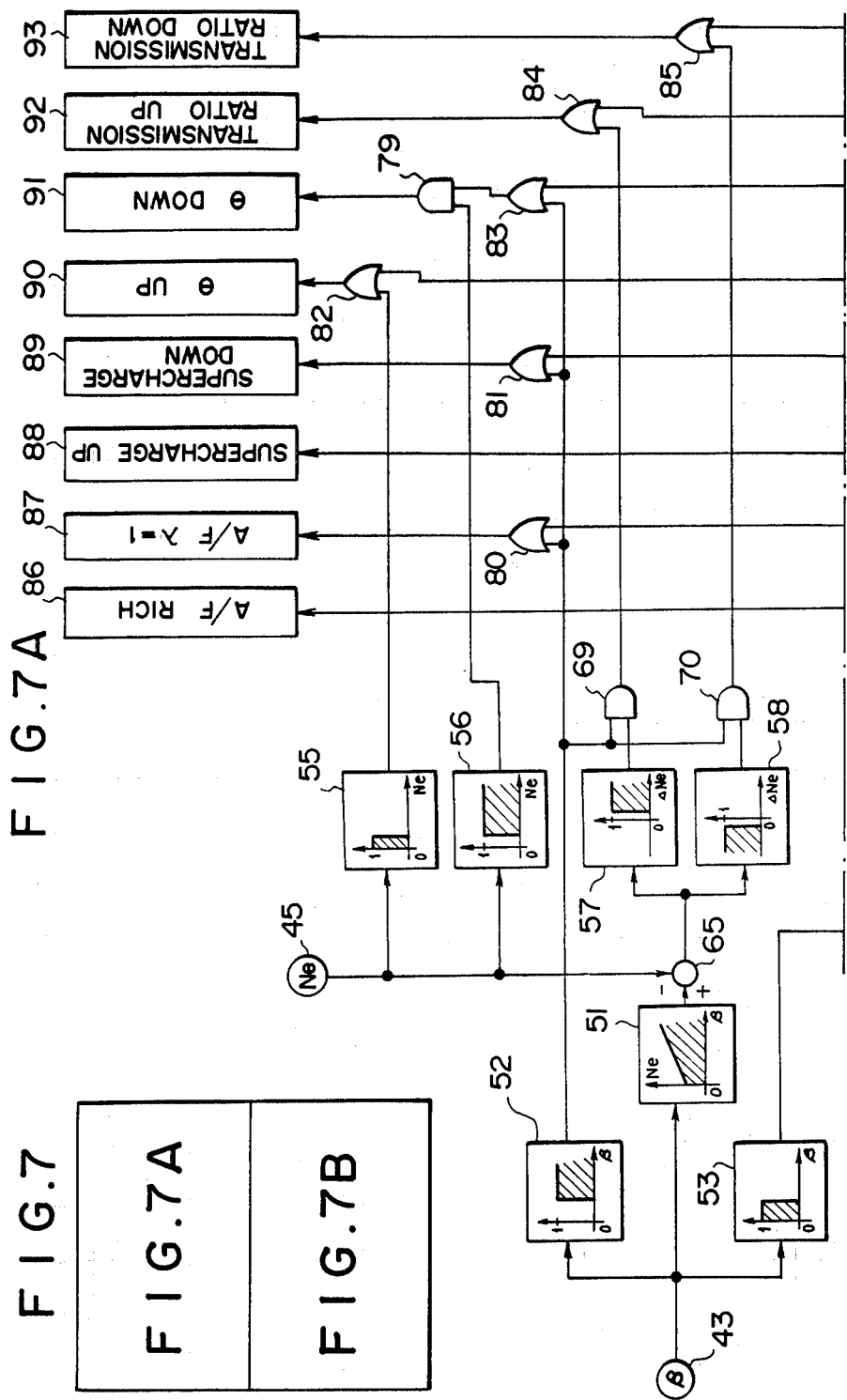

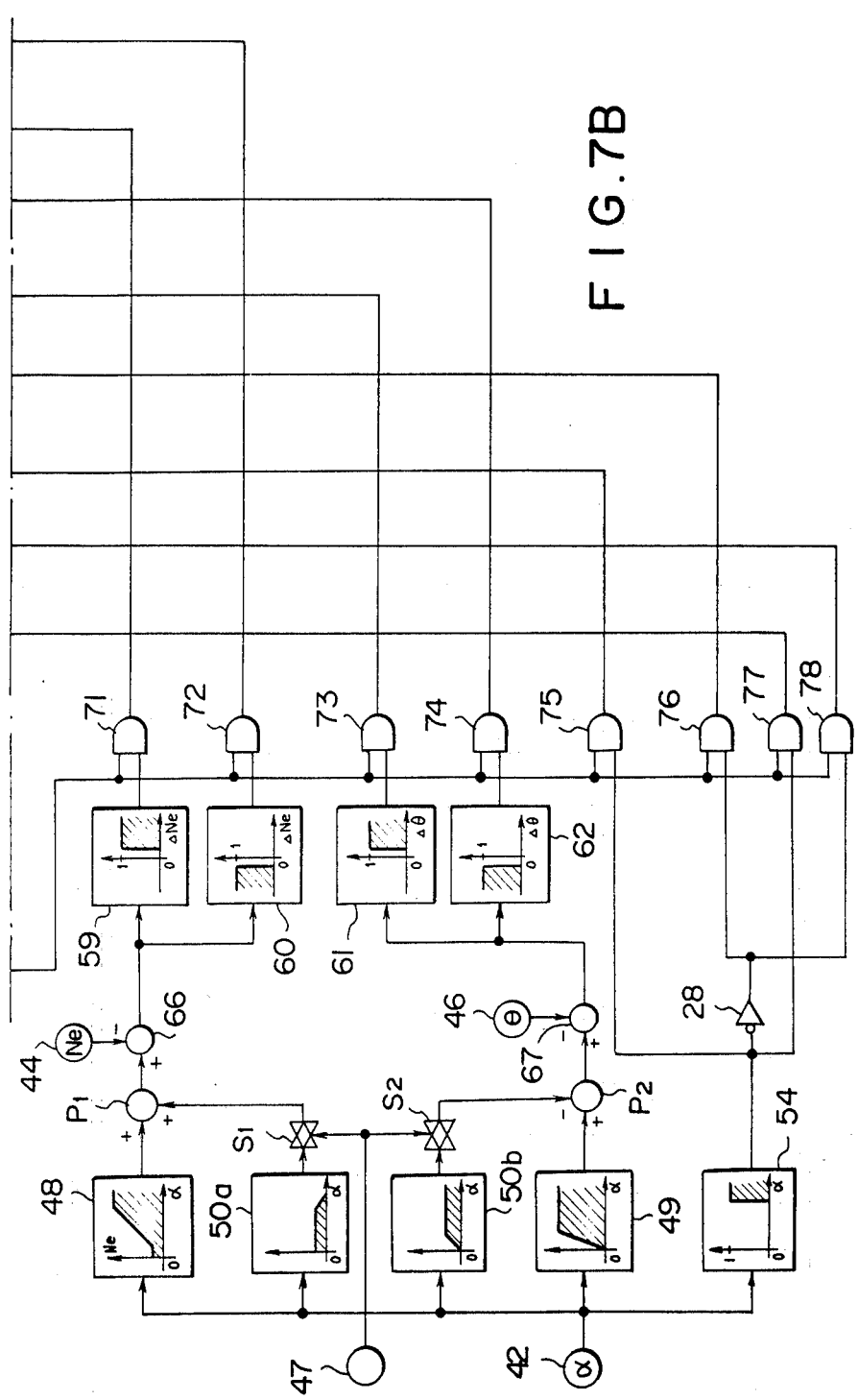

AUTOMOTIVE DRIVING CONTROL SYSTEM UTILIZING A STEPLESS TRANSMISSION

BACKGROUND OF THE INVENTION

1. Field of the Invention

This invention relates to an automotive driving control system, and more particularly to an automotive driving control system for controlling the driving state of an automobile determined by engine speed, torque and the like to a desired state in response to depression of the accelerator pedal.

2. Description of the Prior Art

In FIG. 1a, curves E1, E2 and E3 are contour lines joining points of equal specific fuel consumption in an ordinary automobile depicted on an orthogonal coordinate system which is used to express the operating state of an automobile, the abscissa and the ordinate respectively representing the engine speed (Ne) and the engine torque (Te). In other words, in the ordinary automobile in which a transmission having set transmission ratios is used and the engine output and/or the vehicle speed are controlled by changing the opening degree of the throttle valve, it is necessary to set the engine so that the region D of minimum specific fuel consumption corresponds to an opening degree of the throttle valve slightly smaller than the full or maximum opening degree in order to obtain a large torque during, for instance, acceleration by full opening the throttle valve and at the same time actuating, for instance, an air-fuel ratio enriching device, thereby ensuring reserve torque. When controlling the driving state of an automobile provided with such an engine, it is preferred that the operating state of the automobile be caused to fall within the region D of minimum specific fuel consumption bounded by the curve E1 or near thereto. Curve A in FIG. 1a is a contour line, for the full opening degree of the throttle valve.

In Japanese Unexamined Patent Publication No. 53(1978)-134162, there is disclosed an automotive driving control system embodying a concept for improving the specific fuel consumption. In the control device, the opening degrees and the transmission ratios optimal for the purpose described above are calculated for various operating states of the automobile and mapped, and an optimal throttle valve opening degree and an optimal transmission ratio are read out from the map according to the particular amount of depression of the accelerator pedal to control the throttle valve opening degree and the transmission ratio of the transmission.

In a vehicle provided with such a driving control system, when the engine knocks or when the engine vibrates to resonate the vehicle body, it is preferred that the engine speed be changed to avoid such operating state from the viewpoint of drivability. However, if the engine output is changed by changing the engine speed, torque shock occurs to further adversely affect the drivability.

SUMMARY OF THE INVENTION

In view of the foregoing observations and description, the primary object of the present invention is to provide an automotive driving control system in which engine speed can be changed without changing engine output in order to avoid a particular operating state of the engine such as knock and resonance with the vehicle body.

The automotive driving control system of the present invention comprises a stepless transmission provided between the engine and the driving wheels, a transmission control means for controlling the transmission ratio of the stepless transmission, a throttle valve driving means for driving the throttle valve of the engine, an operating state detecting means for detecting a particular operating state of the engine, and control means for controlling the transmission control means and the throttle valve driving means. The control means controls the transmission control means and the throttle valve driving means to respectively control the opening degree of the throttle valve and the transmission ratio of the stepless transmission so that engine output corresponding to the amount of depression of the accelerator pedal is obtained. When the particular operating state of the engine such as knock or resonance with the vehicle body occurs, the control means controls the transmission control means and the throttle valve driving means to respectively control the opening degree of the throttle valve and the transmission ratio so that the engine speed is changed without changing the engine output corresponding to the amount of depression of the accelerator pedal. That is, in accordance with the present invention, the transmission ratio and the opening degree of the throttle valve are changed along an equi-power curve to change the engine speed without changing the engine output when the particular operating state occurs.

BRIEF DESCRIPTION OF THE DRAWINGS

FIG. 2 is a schematic diagram of a driving control system in accordance with an embodiment of the present invention, FIGS. 7A and 7B, is a view for illustrating the operation of the CPU employed in the system.

DESCRIPTION OF THE PREFERRED EMBODIMENT

Figure 1A:
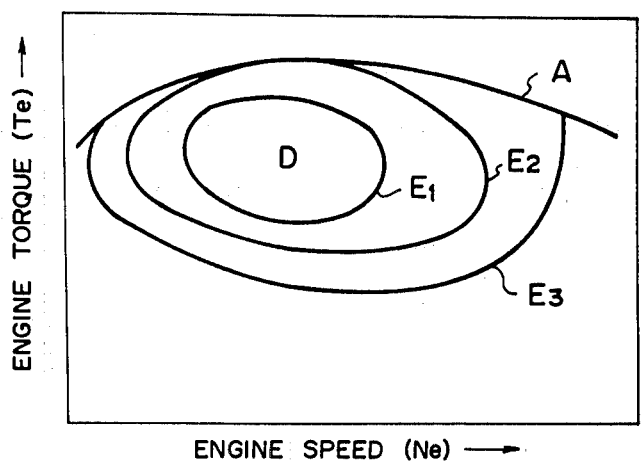
FIG. 1a shows constant specific fuel consumption regions in the case of conventional automobiles in which the abscissa and the ordinate respectively represent the engine speed Ne and the engine torque Te.

FIG. 2 shows an automotive driving control system in accordance with an embodiment of the present invention. In FIG. 2, an engine 1 is provided with a throttle valve 3 in its intake passage 2. A check valve 4 is disposed in the intake passage 2 upstream of the throttle valve 3 and a bypass passage 5 is provided to bypass the check valve 4. A supercharger 6 for increasing torque of the engine 1 is disposed in the bypass passage 5. The driving force of the engine 1 is delivered to the supercharger 6 by way of pulleys 7 and 8 and a belt 9, and an electromagnetic clutch 10 is inserted between the supercharger 6 and the pulley 7 to control the driving force delivered to the supercharger 6. The lower part of the intake passage 2 downstream of the throttle valve 3 is divided into four intake passages 2a to 2d, one for each cylinder. Fuel injection valves 11a to 11d are respectively disposed in the intake passages 2a to 2d.

To the output shaft 12 of the engine 1 is connected a stepless transmission 14 by way of a clutch 14a. The clutch 14a controls delivery of the driving force of the engine 1 to the input shaft 12a of the stepless transmission 14. The driving shaft 15 of the transmission 14 is connected to driving wheels 17 by way of a differential gear 16. The transmission ratio Kg of the stepless transmission 14 is controlled by a transmission control device 18.

Figure 3:
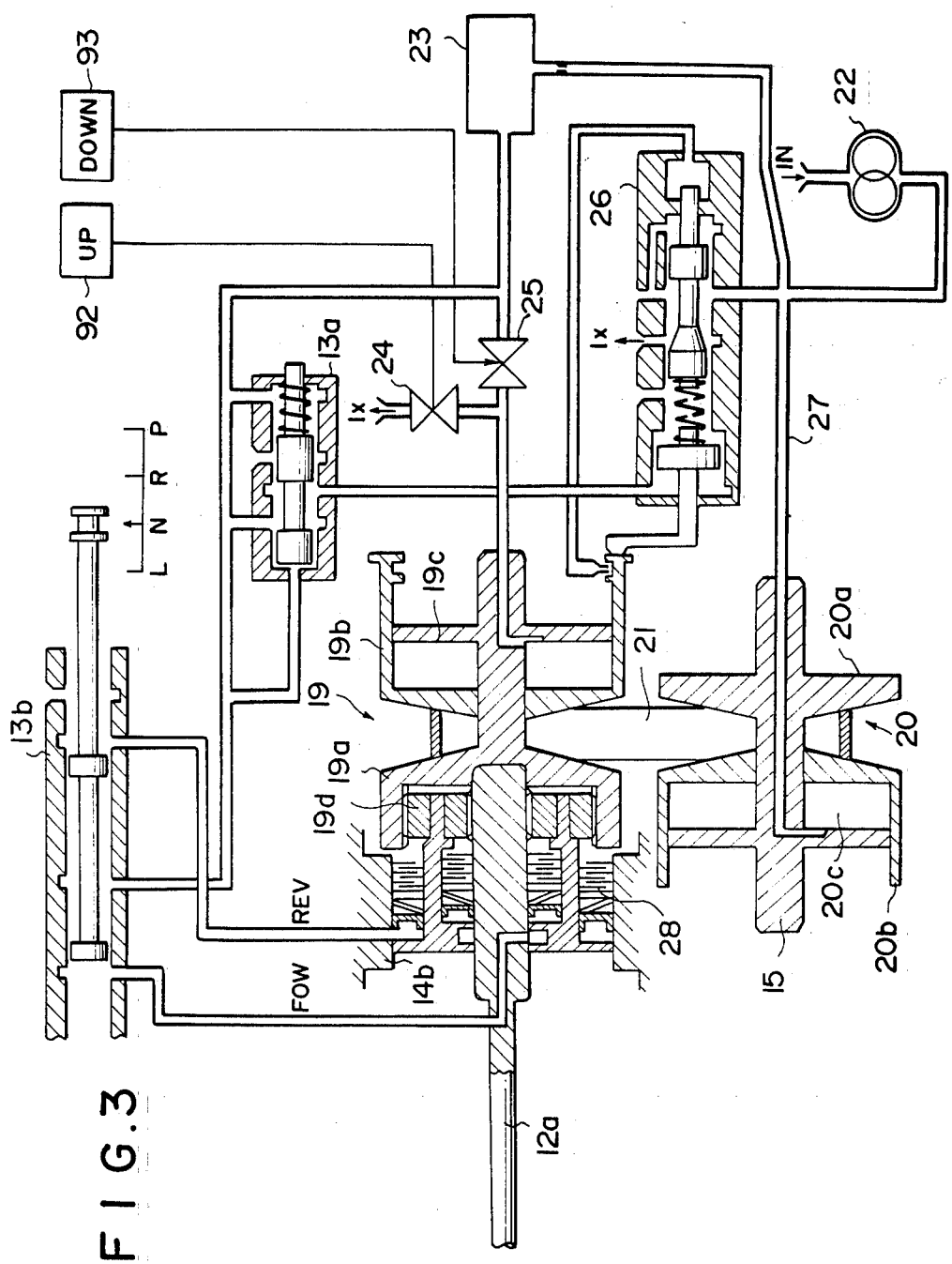
FIG. 3 is a schematic view showing the stepless transmission employed in the system of FIG. 2.

The stepless transmission 14 and the transmission control device 18 are shown in detail in FIG. 3. A primary pulley 19 is mounted on the input shaft 12a which is driven by the output shaft 12 of the engine 1. On the driving shaft 15 is mounted a secondary pulley 20. The pulleys 19 and 20 are connected with each other by way of a V-belt 21. The primary pulley 19 comprises a stationary pulley half 19a and a movable pulley half 19b which is opposed to the stationary pulley half 19a and is movable toward and away from the stationary pulley half 19a. A hydraulic pressure chamber 19c is defined behind the movable pulley half 19b. A planet gear 19d engages the input shaft 12a with the stationary pulley half 19a. A clutch 28, which is in the form of a hydraulic clutch, acts on the planet gear 19d in response to manual operation of a shift lever (not shown). When the shift lever is shifted into "forward" L, the hydraulic clutch 28 causes the planet gear 19d to be fixedly engaged with the input shaft 12a under the control of a manually operated valve 13b which is operated in response to operation of the shift gear, whereby the stationary pulley half 19a of the primary pulley 19 is rotated in the same direction as the input shaft 12a. On the other hand, when the shift lever is shifted into "reverse" R, the planet gear 19d is fixedly engaged with a casing 14b so that the stationary pulley half 19a is rotated in the direction opposite to the input shaft 12a. Similarly to the primary pulley 19, the secondary pulley 20 comprises a stationary pulley half 20a and a movable pulley half 20b which is opposed to the stationary pulley half 20a and is movable toward and away from the stationary pulley half 20a. A hydraulic presure chamber 20c is defined behind the movable pulley half 20b. The hydraulic pressure chambers 19c and 20c are connected to an oil pump 22 by way of an oil passage 27 which is provided with a regulator valve 23. A secondary valve 26 controls delivery and removal of hydraulic pressure to and from the hydraulic pressure chamber 20c of the secondary pulley 20 in response to movement of the movable pulley half 19b of the primary pulley 19. The space between the movable pulley half and the stationary pulley half of each pulley changes according to the hydraulic pressure applied to the corresponding hydraulic pressure chamber, and the V-belt 21 radially moves back and forth in response to the change in the space between the movable and stationary pulley halves. This changes the effective diameter of the primary and secondary pulleys 19 and 20, thereby permitting continuous change in the transmission ratio. A first solenoid valve 25 is provided between the regulator valve 23 and the hydraulic pressure chamber 19c of the primary pulley 19 in order to control delivery of hydraulic pressure to the hydraulic pressure chamber 19c. The first solenoid valve 25 opens upon receipt of a transmission-ratio-down signal 93 (to be described later) to deliver hydraulic pressure to the hydraulic pressure chamber 19c of the primary pulley 19, thereby moving the movable pulley half 19b toward the stationary pulley half 19a to reduce the space therebetween. When the movable pulley half 19b is moved toward the stationary pulley half 19a, the hydraulic pressure chamber 20c of the secondary pulley 20 is relieved under the control of the secondary valve 26 and the movable pulley half 20b is moved away from the stationary pulley half 20a to enlarge the space therebetween, whereby the transmission ratio Kg of the stepless transmission 14 is reduced. Between the hydraulic pressure chamber 19c of the primary pulley 19 and the first solenoid valve 25 is provided a second solenoid valve 24 for controlling removal of hydraulic pressure from the hydraulic pressure chamber 19c of the primary pulley 19. The second solenoid valve 24 opens upon receipt of a transmission-ratio-up signal 92 (to be described later) to relieve hydraulic pressure from the hydraulic pressure chamber 19c, thereby moving the movable pulley half 19b away from the stationary pulley half 19a to enlarge the space therebetween. When the movable pulley half 19b is moved away from the stationary pulley half 19a, hydraulic pressure is delivered to the hydraulic pressure chamber 20c of the secondary pulley 20 under the control of the secondary valve 26 and the movable pulley half 20b is moved toward the stationary pulley half 20a to reduce the space therebetween, whereby the transmission ratio Kg of the stepless transmission is increased. Reference numeral 13a denotes a clutch valve for breaking the driving connection between the primary and secondary pulleys 19 and 20 by way of the V-belt 21.

In FIG. 2, reference numeral 29 denotes an accelerator position sensor for detecting the amount of depression of the accelerator pedal 30, the amount of depression of the accelerator pedal 30 being regarded as a parameter of the engine output requirement in this embodiment. Reference numerals 31, 33 and 34 respectively denote a brake position sensor for detecting the amount of depression of a brake pedal 32, an engine speed sensor for detecting engine rpm, and an airflow meter for detecting the amount of intake air. Reference numerals 35 and 36 respectively denote a throttle position sensor for detecting the opening degree of the throttle valve 3 and a throttle valve actuator for opening and closing the throttle valve 3. Reference numeral 37 denote a knock sensor as the means for detecting the particular operating state of the engine 1.

Figure 4:
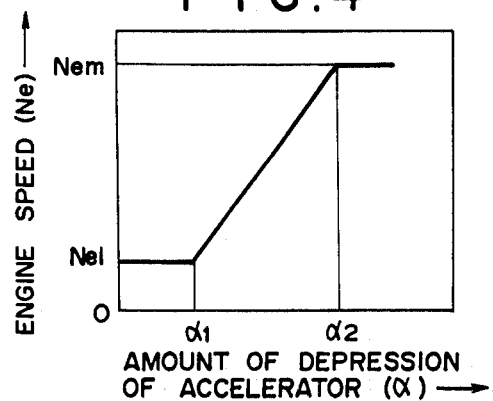
FIG. 4 is a view showing the characteristics of the first target engine speed stored in the memory employed in the system of FIG. 2.
Figure 5:
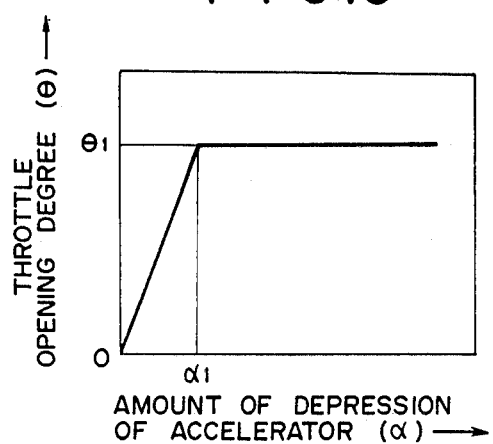
FIG. 5 is a view showing the characteristics of the target opening degree of the throttle valve stored in the memory.
Figure 6:
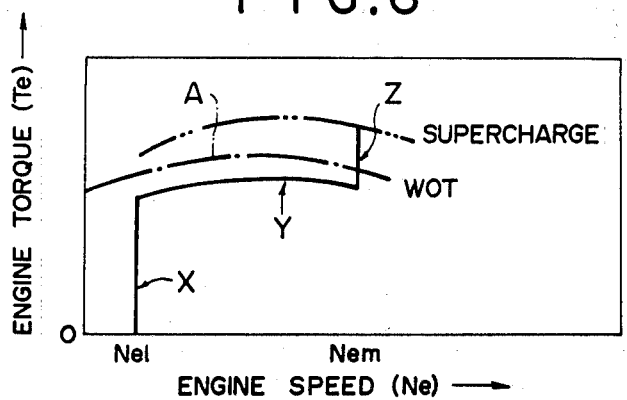
FIG. 6 is a view for illustrating the operation of the system, FIG. 7, which constitutes

Reference numeral 38 denotes a control circuit comprising an input/output interface 39, a CPU 40 and a memory 41. The memory 41 stores a program for operation, maps of first and second target engine speeds and a map of target opening degree of the throttle valve. In the map, the first target engine speed is related to the amount of depression of the accelerator pedal 30 as shown in FIG. 4. That is, the first target engine speed is held constant at a first value Ne1 when the amount of depression of the accelerator pedal 30 is smaller than a first preset value α1, and at a second value Nem when the amount of depression α of the accelerator pedal 30 is larger than a second preset value α2. When the amount of depression α of the accelerator pedal 30 is between the first and second preset values α1 and α2, the first target engine speed is substantially linearly increased with increase of the amount of depression α of the accelerator pedal 30. The target opening degree of the throttle valve is related to the amount of depression of the accelerator pedal 30 as shown in FIG. 5. That is, the target opening degree of the throttle valve is increased linearly with increase in the amount of depression α of the accelerator pedal 30 so long as the amount of depression α is smaller than the first preset value α1, and is held at a predetermined constant value θ1 when the amount of depression is not smaller than the first preset value α1. The CPU 40 receives detection signals from the sensors 29, 31, 33, 34 and 35 and accomplishes predetermined operation to control the transmission control device 18, the throttle valve actuator 36, the fuel injection valves 11a to 11d and the supercharger 6 so that the engine speed-torque characteristics shown by the solid line in FIG. 6 are obtained. That is, when the amount of depression α of the accelerator pedal 30 is not larger than the first preset value α1, the engine speed is held at the first value Nel and the opening degree of the throttle valve is changed according to the amount of depression α of the accelerator pedal 30 (the part of the solid line indicated at X). When the amount of depression α of the accelerator pedal 30 is between the first and second preset values α1 and α2, the opening degree of the throttle valve is held at the predetermined constant value θ1 and at the same time the engine speed is changed according to the amount of depression α of the accelerator pedal 30 (the part of the solid line indicated at Y). When the amount of depression of the accelerator pedal 30 is larger than the second preset value α2, the engine speed and the opening degree of the throttle valve are both held constant, respectively at the second value Nem and the predetermined constant value θ1 (the part of the solid line indicated at Z). Further the CPU 40 reduces the opening degree of the throttle valve 3 and controls the engine speed according to the amount of depression 8 of the brake pedal 32 when the amount of depression of the brake pedal 32 is larger than a preset value. As for control of the amount of fuel to be injected, the CPU 40 generates a fundamental fuel injection pulse appropriate for obtaining a stoichiometric air-fuel ratio λ (=1) according to the engine speed and the amount of intake air when the amount of depression α of the accelerator pedal 30 is not larger than the second preset value α2, while when the amount of depression α of the accelerator pedal 30 is larger than the second preset value α2, the CPU 40 corrects the fundamental fuel injection pulse to the air-fuel mixture, for instance, to an air-fuel ratio of 13.5. Further the CPU 40 controls the electromagnetic clutch 10 so that supercharging is started and the driving force of the engine 1 is delivered to the supercharger 6 according to the amount of depression α of the accelerator pedal 30 when the amount of depression α of the accelerator pedal 30 exceeds the second preset value α2.

The control described above is particularly advantageous from the viewpoint of the specific fuel consumption and is based upon the following concept.

A study of the driving control of an automobile from the viewpoint of the engine speed-torque characteristics reveals the following.

Figure 1B:
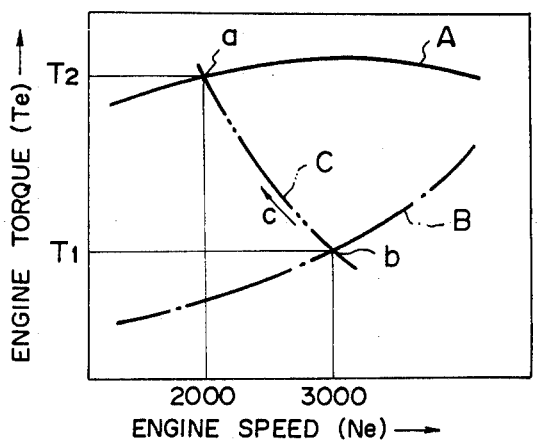
FIG. 1b shows engine speed-torque characteristic curves for illustrating the principle of a preferred embodiment of the present invention.
Figure 1C:
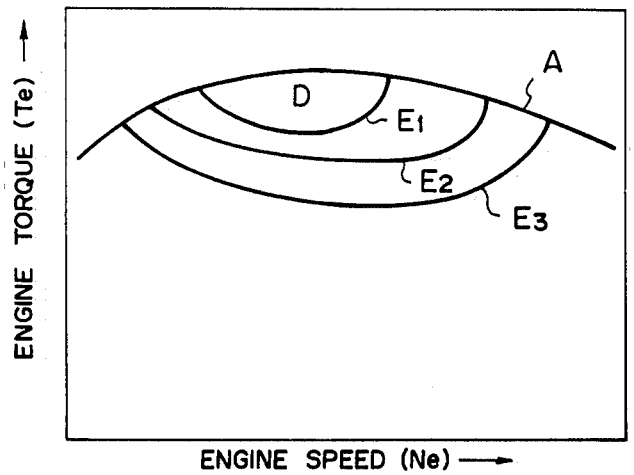
FIG. 1c is a view similar to FIG. 1a but in the case of an automobile provided with the driving control system in accordance with the preferred embodiment.

In FIG. 1b, line A is an engine speed-torque characteristic curve showing the relationship between torque and speed in case that the throttle valve is fixed at the full open position (This curve will be referred to as "full open line", hereinbelow.), line B is the same in case that the transmission ratio is fixed (This curve will be referred to as "fixed gear line", hereinbelow.), and line C is the same in case that the engine output is fixed (This curve will be referred to as "fixed output line", hereinbelow.). In almost all the conventional automobiles, since a transmission having preset transmission ratios, e.g., first speed to fifth speed, is used and the engine speed-torque characteristics in the case of fixed transmission ratio are as shown by the fixed gear line B, it has been necessary to control the engine output by controlling the throttle valve opening degree. When it is assumed that the engine output is 80PS in a certain operating state on the fixed gear line B, e.g., operating state b corresponding to an engine speed of 3000 rpm and a torque T1, and when the engine speed is gradually lowered without changing the engine output, torque is increased along the fixed output line C as shown by the arrow c and takes value T2 at the intersection a of the fixed output line C and the full open line A, the value of the engine speed at the intersection a being 2000 rpm. This means that any engine output which has conventionally been obtained with a fixed transmission ratio can be obtained with the throttle valve fixed at the full open position by changing the transmission ratio. That is, by using a stepless transmission so that the transmission ratio can be continuously changed, the automobile can be controlled to a desired operating state with the throttle valve held full open. Further, since the engine output and the vehicle speed can be ensured, with this control system, by changing the transmission ratio, an engine having the region D of the minimum specific fuel consumption near the full open line A as shown in FIG. 1c can be used. Further in this control system, the pressure in the intake passage downstream of the throttle valve cannot become negative and accordingly pumping loss of the engine output can be substantially reduced.

The operation of the CPU 40 is illustrated in FIG. 7 in which the operation of the CPU 40 is represented by hard circuitry for the sake of convenience of explanation. In FIG. 7, reference numerals 42 and 43 respectively denote an accelerator depression signal which is the detection signal of the accelerator position sensor 29, and a brake depression signal which is the detection signal of the brake position sensor 31. Reference numerals 44 and 45 both denote engine rpm signals from the engine speed sensor 33. Reference numerals 46 and 47 respectively denote a throttle opening degree signal which is the detection signal of the throttle position sensor 35, and a knock signal which is the detection signal of the knock sensor 37.

In FIG. 7, the rectangular frames which are indicated at reference numerals 48, 49, 50a, 50b and 51 and in which characteristic are curves depicted are function generators, the output of each function generator being related to the input thereto as shown by the corresponding characteristic curve, the output and the input being respectively represented by values on the ordinate and the abscissa. Actually each characteristic curve is stored as a map and the CPU 40 reads out the memorized value of the output corresponding to a given input from the map. This is represented by the function generator in the hard circuitry in FIG. 7. More particularly, the function generator 48 represents a first target engine speed generator which receives the accelerator depression signal 42 representing the amount of depression $\alpha$ of the accelerator pedal 30 and generates the first target engine speed described above with reference to FIG. 4. The function generator 49 represents a target throttle opening degree generator which receives the accelerator depression signal 42 and generates the target opening degree of the throttle valve described above in conjunction with FIG. 7. The function generators 50a and 50b respectively represent first and second correction value generators which respectively generate correction values for correcting the first target engine speed and the target opening degree of the throttle valve when knock occurs as will be described in detail hereinbelow. The function generator 51 represents a second target engine speed generator which receives the brake depression signal 43 representing the amount of depression of the brake pedal 32 and generates a second target engine speed.

Further, in FIG. 7, the rectangular frames indicated at reference numerals 52 to 62 are determining means each for determining whether or not the input thereinto is larger than a preset value. Each determining means outputs "1" when the input thereinto falls within the hatched region shown in its rectangular frame. Reference numerals 65 to 67 respectively denote adders for adding two inputs, reference numerals 69 to 79 respectively denote AND gates, and reference numerals 80 to 85 respectively denote OR gates. Further, reference numerals 86 to 93 respectively denote control signals which are obtained when the signals from the gates 69 to 79 are "1". More particularly, reference numeral 86 denotes an air-fuel ratio enriching signal for enriching the air-fuel mixture. When the air-fuel ratio enriching signal 86 is generated, the fundamental fuel injection pulse is corrected to enrich the air-fuel mixture. Reference numeral 87 denotes a stoichiometric air-fuel ratio signal. When the stoichiometric air-fuel ratio signal 87 is generated, the fundamental fuel injection pulse is used as the injection pulse without being corrected so that the air-fuel ratio is set at the stoichiometric value. Reference numerals 88 and 89 respectively denote a supercharging-on-signal for starting supercharging, and a supercharging-off-signal for interrupting supercharging. Reference numerals 90 and 91 respectively denote a throttle-opening-degree-up signal for increasing the opening degree of the throttle valve 3, and a throttle-opening-degree-down signal for reducing the opening degree of the throttle valve 3. Further, reference numerals 92 and 93 respectively denote the aforesaid transmission-ratio-up signal for increasing the transmission ratio Kg and transmission-ratio-down signal for reducing the transmission ratio Kg.

Now, operation of the system of this embodiment will be briefly described referring to FIGS. 2 and 6. The output of the engine 1 is delivered to the driving wheels 17 by way of the stepless transmission 14 and the differential gear 16. The CPU 40 in the control circuit 38 receives the detecting signals from the accelerator position sensor 29, the brake position sensor 31, the engine speed sensor 33, the airflow meter 34 and the knock sensor 37, and accomplishes the predetermined operation. When the amount of depression $\alpha$ of the accelerator pedal 30 smaller than the first preset value (i.e., during low speed light load operation of the engine), the CPU 40 controls the transmission control device 18 and the throttle valve actuator 36 to hold the engine speed constant at said first value Nel, as shown by the part of the solid line indicated at X in FIG. 6, which is the minimum value within the stability limit, and at the same time to change the opening degree of the throttle valve with change in the amount of depression $\alpha$ of the accelerator pedal 30, and at the same time the CPU 40 controls the amount of fuel to be injected from the fuel injection valves 11a to 11d so that the air-fuel ratio is set at a stoichiometric value, thereby ensuring the engine output requirement by only changing the opening degree of the throttle valve 3.

When the operating state of the vehicle changes from low speed travel to steady running state and the amount of depression $\alpha$ of the accelerator pedal 30 becomes between the first and second preset values $\alpha 1$ and $\alpha 2$, the CPU 40 controls the transmission control device 18 and the throttle valve actuator 36 to hold constant the opening degree of the throttle valve 3 near full open and to change the engine speed with change in the amount of depression $\alpha$ of the accelerator pedal 30 as shown by the part of the solid line indicated at Y in FIG. 6, and at the same time the CPU 40 controls the air-fuel ratio to the stoichiometric value, thereby ensuring the engine output requirement by only changing the engine speed. When knock occurs, the CPU 40 corrects the opening degree of the throttle valve 3 and the transmission ratio Kg along an equi-power curve to change the engine speed without changing the engine output, thereby preventing knock, as will be described in more detail hereinbelow.

When the operating state of the vehicle changes to high speed heavy load operation as during high speed travel of the vehicle or during acceleration of the vehicle, and the amount of depression $\alpha$ of the accelerator pedal 30 exceeds the second preset value $\alpha 2$, the CPU 40 controls the transmission control device 18 and the throttle valve actuator 36 to hold the engine speed and the opening degree of the throttle valve 3 constant respectively at the second value Nem and the predetermined constant value $\theta 1$ as shown by the part of the solid line indicated at Z in FIG. 6, and at the same time the CPU 40 controls amount of the fuel to be injected so that air-fuel mixture is enriched and actuates the electromagnetic clutch 10 to drive the supercharger 6, thereby increasing engine torque and ensuring engine output larger than the maximum engine output without supercharging.

When the brake pedal 32 is pushed down to decelerate the vehicle, the CPU 40 controls the throttle valve actuator 36 to reduce the opening degree of the throttle valve 3 and controls the transmission control device 18 to change the engine speed according to the amount of depression $\beta$ of the brake pedal 32, thereby producing engine-brake effect having a magnitude corresponding to the amount of depression $\beta$ of the brake pedal 32, which decelerates the vehicle together with the ordinary braking system.

Now operation of the system of this embodiment will be described in detail referring to FIG. 7. While the accelerator pedal 30 is pushed down, normally the brake pedal 32 is not pushed down, and accordingly the determining means 53 outputs "1" to open all the AND gates 71 to 78. At the same time the determining means 56 outputs "1" to open the AND gate 79 since the engine speed Ne is higher than the minimum speed. When the amount of depression $\alpha$ of the accelerator pedal 30 is not larger than the first preset value $\alpha 1$ in this state, the first target engine speed generator 48 generates the first value Nel which is a fixed value, and the adder 66 calculates the difference between the first value Nel and the actual engine speed Ne. When the actual engine speed Ne is lower than the first value Nel, the determining means 59 outputs "1" which signal constitutes the transmission-ratio-up signal 92 after passing through the AND gate 71 and the OR gate 84, whereby the transmission ratio Kg of the stepless transmission 14 is increased and the actual engine speed Ne is increased. On the other hand, when the actual engine speed Ne is higher than the first value Nel, the determining means 60 outputs "1" which signal constitutes the transmission-ratio-down signal 93 after passing through the AND gate 72 and the OR gate 85, whereby the transmission ratio of the transmission 14 is reduced and the actual engine speed Ne is lowered. When the actual engine speed Ne is equalized to the first value Nel, the outputs of the determining means 59 and 60 both turn to "0" and accordingly the actual engine speed Ne is held constant at the first value Nel.

At the same time, the target throttle opening degree generator 49 generates the target opening degree of the throttle valve 3 corresponding to the amount of depression $\alpha$ of the accelerator pedal 30 represented by the accelerator depression signal 42, and the adder 67 calculates the difference between the target opening degree of the throttle valve 3 and the actual opening degree $\theta$ of the throttle valve 3. When the latter is smaller than the former, the determining means 61 outputs "1" which signals constitutes the throttle-opening-degree-up signal 90 after passing through the AND gate 73 and the OR gate 82, whereby the opening degree of the throttle valve 3 is increased. On the other hand when the actual opening degree $\theta$ of the throttle valve 3 is larger than the target opening degree of the throttle valve 3, the determining means 62 outputs "1" which signal constitutes the throttle-opening-degree-down signal 91 after passing through the AND gate 74, the OR gate 83 and the AND gate 79, whereby the opening degree $\theta$ of the throttle valve 3 is reduced. When the actual opening degree of the throttle valve 3 is equalized to the target opening degree, the outputs of the determining means 61 and 62 both turn to "0" and neither the throttle-opening-degree-up signal 90 nor the throttle-opening-degree-down signal 91 is generated, whereby the opening degree of the throttle valve 3 is controlled to the value corresponding to the amount of depression of the accelerator pedal 30.

Further, since the amount of depression $\alpha$ of the accelerator pedal 30 is not larger than the second preset value $\alpha 2$, the output of the determining means 54 is kept at "0", and the signal "1", which is the inverted signal of the output of the determining means 54, constitutes the stoichiometric air-fuel ratio signal 87 after passing through the AND gate 78 and the OR gate 80, whereby the fundamental fuel injection pulse which is determined according to the engine speed and the amount of intake air is directly fed to the fuel injection valves 11a to 11d without correction to control the air-fuel ratio to the stoichiometric value $\lambda = 1$.

When the amount of depression of the accelerator pedal 30 is increased to between the first and second preset values $\alpha 1$ and $\alpha 2$ from below the first preset value $\alpha 1$, the first target engine speed generator 48 generates the first target engine speed corresponding to the amount of depression of the accelerator pedal 30, and at the same time the target throttle opening degree generator 49 generates the predetermined constant value $\theta 1$ near the full open value, whereby the transmission control device 18 and the throttle actuator 36 are controlled in the manner similar to that described above to equalize the actual engine speed to the target engine speed corresponding to the amount of depression $\alpha$ of the accelerator pedal 30 and to hold the opening degree of the throttle valve 3 at the predetermined constant value $\theta 1$ near the full open value. Further, the air-fuel ratio is controlled to the stoichiometric value and supercharging is not carried out at this time.

When the amount of depression $\alpha$ of the accelerator pedal 30 becomes larger than the second preset value $\alpha 2$, the first target engine speed generator 48 generates the second value Nem which is a fixed value, and the target throttle opening degree generator 49 generates the constant value $\theta 1$ which is a fixed value near the full open value. The transmission control device 18 and the throttle actuator 36 are controlled to converge the actual engine speed to the second value Nem and to equalize the opening degree of the throttle valve to the constant value $\theta 1$. Further, when the amount of depression $\alpha$ of the accelerator pedal 30 is larger than the second preset value $\alpha 2$, the determining means 54 outputs "1" and the signal "1" makes the air-fuel ratio enriching signal 86 after passing through the AND gate 77, and makes the supercharging-on signal 88 after passing through the AND gate 75. The air-fuel ratio enriching signal 86 corrects the fundamental fuel injection pulse to be fed to the fuel injection valves 11a to 11d so that the air-fuel ratio is enriched. The supercharging-on signal 88 engages the electromagnetic clutch 10 so that the driving force of the engine is delivered to the supercharger 6.

When knock occurs (as an example of the particular operating state), the knock signal 47 opens analog switches S1 and S2. When the analog switch S1 opens, a correction value read out from the first correction map 50a is added to the first target engine speed read generated by the first target engine speed generator 48 at adding point P1. Then the corrected first target engine speed is inputted into the adder 66 to generate the transmission ratio up signal 92 or the transmission ratio down signal 93 in the manner described above. When the analog switch S2 opens, a correction value read out from the second correction map 50b is subtracted from the target opening degree of the throttle valve generated by the target throttle opening degree generator 49 at a subtracting point P2. Then the corrected target opening degree of the throttle valve is inputted into the adder 67 to generate the throttle opening degree up signal 90 or the throttle opening degree down signal 91 in the manner described above.

When the accelerator pedal 30 is released and the brake pedal 32 is pushed down, the output of the determining means 53 turns to "0" to close all the AND gates 71 to 78, and at the same time the output of the determining means 52 turns to "1" to open the AND gates 69 and 70. The signal "1" from the determining means 52 constitutes the stoichiometric air-fuel ratio signal 87 after passing through the OR gate 80, the supercharging-off-signal 89 after passing through the OR gate 81 and the throttle-opening-degree-down signal 91 after passing through the OR gate 83 and AND gate 79, whereby the air-fuel ratio is controlled to the stoichiometric value, supercharging is interrupted, and the throttle valve 3 is closed. Further, the second target engine speed generator 51 generates the second target engine speed corresponding to the amount of depression β of the brake pedal 32, and the adder 65 calculates the difference between the second target engine speed and the actual engine speed Ne. When the former is higher than the latter, the determining means 57 outputs "1" which signal constitutes the transmission-ratio-up signal 92 after passig through the AND gate 69 and the OR gate 84, whereby the transmission ratio Kg is increased to increase the actual engine speed Ne. On the other hand, when the actual engine speed Ne is higher than the second target engine speed, the determining means 58 outputs "1" which signal constitutes the transmission-ratio-down signal 93 after passing through the AND gate 70 and OR gate 85, whereby the transmission ratio Kg is reduced to reduce the engine speed. When the actual engine speed Ne is equalized to the second target engine speed, the output of the adder 65 turns to "0", and accordingly neither the transmission-ratio-up signal 92 nor the transmission-ratio-down signal 93 is generated.

Now the first and second correction maps 50a and 50b will be described in detail with reference to FIG. 9.

Figure 9A:
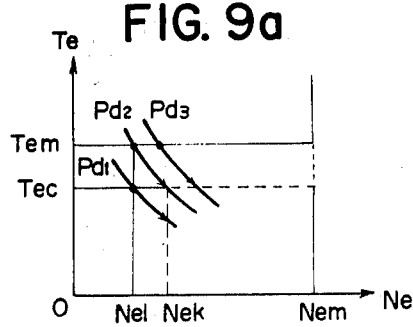
FIGS. 9a to 9e are views for illustrating in detail the first and second correction maps shown in FIG. 7.
Figure 9B:
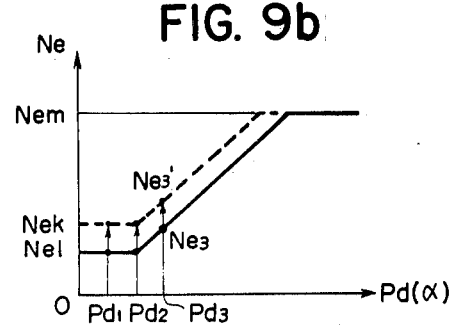
Figure 9C:
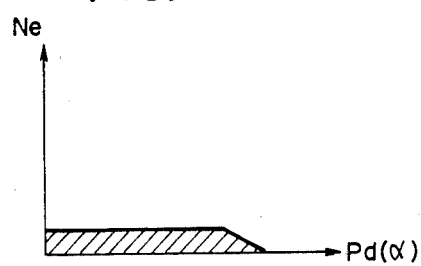
Figure 9D:
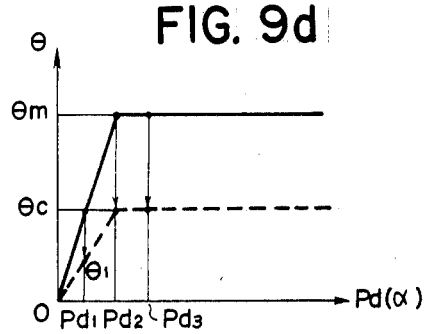
Figure 9E:
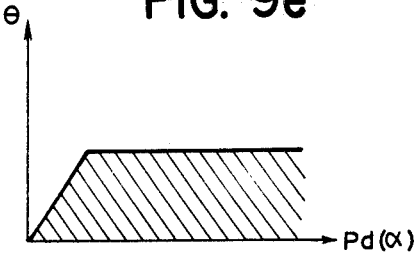

The engine performance characteristic curve (engine speed Ne-engine torque Te curve) of the engine of this embodiment is as shown by the solid line in FIG. 9a. The solid line in FIG. 9b shows the engine output Pd (amount of depression α of the accelerator pedal)-engine speed Ne curve depicted based on the performance curve which corresponds to the curve shown in FIG. 4. Further, the solid line in FIG. 9d shows the engine output Pd (amount of depression α of the accelerator pedal)-throttle valve opening degree θ (equivalent to the engine torque Te) curve depicted based on the performance curve which corresponds to the curve shown in FIG. 5. In this embodiment, the engine performance characteristic curve is corrected to that shown by the dotted line in FIG. 9a when knock occurs. That is, the minimum engine speed is inoreased from Nel to Nek and the maximum torque is reduced from Tem to Tec along the equipower curves Pd1, Pd2, Pd3 . . . The dotted line in FIG. 9b shows the Pd (α)-Ne curve depicted based on the corrected engine performance curve shown by the dotted line. The dotted line in FIG. 9d shows Pd (α)-θ (Te) curve depicted based on the corrected engine performance curve. When subtracting the curve shown by the solid line in FIG. 9b from the curve shown by the dotted line, the first correction map 50a shown in FIG. 9c is obtained. Similarly when subtracting the curve shown by the dotted line in FIG. 9d from the curve shown by the solid line, the second correction map 50b shown in FIG. 9e is obtained. Since the corrected performance curve is obtained by sliding the original performance curve shown by the solid line along the equi-power curves Pd1, Pd2, Pd3 . . . , the engine speed can be changed without changing the engine output corresponding to the amount of depression α of the accelerator pedal by correcting the opening degree θ of the throttle valve and transmission ratio Kg with the correction maps 50a and 50b.

When the transmission ratio Kg, the engine speed Ne and the opening degree θ of the throttle valve differ from each other in changing speed, the engine speed cannot be precisely changed along the equi-power curve and some torque shock occurs. Therefore, it is preferred that the correction values be gradually added to the target engine speed and the target opening degree of the throttle valve so that the transmission ratio Kg and the opening degree θ of the throttle valve are slowly changed.

Figure 8:
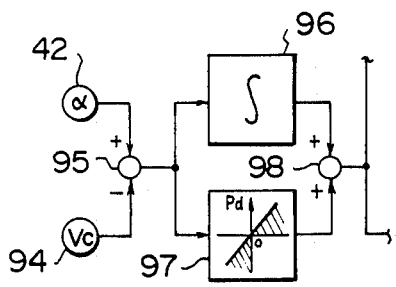
FIG. 8 is a view for illustrating the operation of the CPU in accordance with another embodiment of the present invention.

Though in the above embodiment, the amount of depression α of the accelerator pedal is regarded as a parameter of engine output requirement, it may be regarded as a parameter of vehicle speed requirement. FIG. 8 shows another embodiment of the present invention in which the amount of depression α of the accelerator pedal is regarded as a parameter of vehicle speed requirement. In FIG. 8, reference numeral 94 denotes a vehicle speed signal outputted from a vehicle speed sensor (shown by chained line 99 in FIG. 2), and the reference numeral 95 denote an adder for calculating the difference between the actual vehicle speed Vc represented by the vehicle speed signal 94 and the accelerator depression signal 42 which is a parameter of vehicle speed requirement. Reference numeral 96 denotes an integrator which integrates the output of the adder 96 to calculate the engine output corresponding to the vehicle speed requirement. Reference numeral 97 denotes an engine output generator for reading out, from a map, an engine output corresponding to the output of the adder 95 so that the output of the adder 95 is nullified. The reference numeral 98 denotes an adder which adds the integrated value from the integrator 96 and the output of the engine output generator 97.

In the system of this embodiment, the amount of depression α of the accelerator pedal is regarded as the vehicle speed requirement, and the engine output requirement Pd is calculated from the difference between the amount of depression α of the accelerator pedal and the actual vehicle speed Vc. Subsequently the same control as in the embodiment described in FIG. 7 is carried out using the engine output requirement Pd. Further, since an integrating element is included in the circuitry for calculating the engine output requirement, feedback is provided to nullify the difference between the amount of depression α of the accelerator pedal and the actual vehicle speed Vc, whereby the difference is nullified during steady running of the vehicle, and the engine output is equalized to the running load of the engine output requirement Pd.

Though in the above embodiments, the transmission ratio Kg and the opening degree of the throttle valve are changed so that the engine output requirement represented by the amount of depression of the accelerator pedal can be obtained with a minimum fuel consumption, the present invention can be applied to any other automotive driving control systems in which the transmission ratio Kg and the opening degree of the throttle valve are changed so that the engine output corresponding to the amount of depression α of the accelerator pedal.

We claim:

1. An automotive driving control system comprising a stepless transmission provided between an engine and driving wheels, a transmission control means for controlling the transmission ratio of the stepless transmission, a throttle valve driving means for driving the throttle valve of the engine, an accelerator position detecting means for detecting the amount of depression of the accelerator pedal, an operating state detecting means for detecting a particular operating state of the engine, a control means which receives the signal from the accelerator position detecting means and controls the transmission control means and the throttle valve driving means to respectively control the transmission ratio of the stepless transmission and the opening degree of the throttle valve so that engine output requirement corresponding to the amount of depression of the accelerator pedal can be obtained, said control means including means for predetermining the engine speed and the opening degree of the throttle valve corresponding to the amount of depression of the accelerator pedal and said control means controlling said transmission control means and said throttle valve driving means to obtain said predetermined engine speed and opening degree of the throttle valve, the control means being adapted to change said predetermined engine speed and opening degree of the throttle valve so that the predetermined engine speed is increased and the predetermined opening degree of the throttle valve is decreased, respectively, without changing the engine output when said particular operating state of the engine occurs.

2. An automotive driving control system as defined in claim 1 in which said particular operating state of the engine is knock of the engine.

3. An automotive driving control system as defined in claim 1 in which said control means controls the transmission control means and the throttle valve driving means to respectively control the transmission ratio of the stepless transmission so that the engine speed is increased and the throttle valve so that the opening degree of the throttle valve is reduced.

4. An automotive driving control system as defined in claim 1 in which the engine speed and the opening degree of the throttle valve are mapped corresponding to the amount of depression of the accelerator pedal and are respectively memorized in memories.

5. An automotive driving control system as defined in claim 4 in which the output of each memory is corrected so that the transmission ratio and the opening degree of the throttle valve are changed along an equipower curve when said particular operating state of the engine occurs.

6. An automotive driving control system as defined in claim 1 in which said control means is adapted to control, when the amount of depression of the accelerator pedal is within a predetermined range, the throttle valve driving means so that the opening degree of the throttle valve is fixed at a predetermined constant value irrespective of the amount of depression of the accelerator pedal, and the transmission control means to control the transmission ratio of the stepless transmission to change the engine speed so that the engine output requirement represented by the amount of depression of the accelerator obtained with the predetermined constant value of the opening degree of the throttle valve.

7. An automotive driving control system as defined in claim 6 in which said predetermined range is defined as a range between first and second preset values, the first preset value being smaller than the second preset value.

8. An automotive driving control system as defined in claim 7 in which the transmission control means controls the transmission ratio of the stepless transmission so that the engine speed is held at a constant value and at the same time the throttle valve driving means controls the opening degree of the throttle valve to the value corresponding to the amount of depression of the accelerator pedal when the amount of depression of the accelerator pedal is outside said predetermined range.

9. An automotive driving control system as defined in claim 8 in which said predetermined constant value of the opening degree of the throttle valve is near full open.

10. An automotive driving control system as defined in claim 8 in which when the amount of depression of the accelerator pedal is not larger than the first preset value, the transmission control means controls the transmission ratio of the stepless transmission so that the engine speed is maintained at the minimum value within the stability limit and the throttle valve driving means control the opening degree of the throttle valve so that the engine output requirement represented by the amount of depression of the accelerator pedal can be obtained.

* * * * *